United States Patent
Bi et al.

(10) Patent No.: US 7,889,692 B2
(45) Date of Patent: Feb. 15, 2011

(54) PACKET ERROR RATE ESTIMATION IN A COMMUNICATION SYSTEM

(75) Inventors: Qi Bi, Morris Plains, NJ (US); Dongzhe Cui, Parsippany, NJ (US); Qinqing Zhang, Morganville, NJ (US)

(73) Assignee: Alcatel-Lucent USA, Inc., Murray Hill, NJ (US)

( * ) Notice: Subject to any disclaimer, the term of this patent is extended or adjusted under 35 U.S.C. 154(b) by 1320 days.

(21) Appl. No.: 10/954,760

(22) Filed: Sep. 30, 2004

(65) Prior Publication Data

US 2006/0067242 A1 Mar. 30, 2006

(51) Int. Cl.
 *H04W 4/00* (2009.01)
(52) U.S. Cl. ...................................... 370/328; 370/252
(58) Field of Classification Search .................. 370/252, 370/328
 See application file for complete search history.

(56) References Cited

U.S. PATENT DOCUMENTS

| | | | | |
|---|---|---|---|---|
| 6,181,917 | B1 * | 1/2001 | Mansour et al. | 455/63.1 |
| 6,516,027 | B1 * | 2/2003 | Kapoor et al. | 375/227 |
| 6,633,552 | B1 * | 10/2003 | Ling et al. | 370/318 |
| 2002/0012326 | A1 * | 1/2002 | Chang | 370/318 |
| 2003/0072294 | A1 * | 4/2003 | Wei et al. | 370/345 |
| 2003/0224836 | A1 * | 12/2003 | Tsai et al. | 455/573 |
| 2004/0018842 | A1 * | 1/2004 | Yu | 455/437 |
| 2004/0148552 | A1 * | 7/2004 | Matsumoto et al. | 714/712 |

FOREIGN PATENT DOCUMENTS

| | | |
|---|---|---|
| EP | 1 533 935 A1 | 5/2005 |
| WO | WO 99/46869 | 9/1999 |
| WO | WO 00/48336 | 8/2000 |
| WO | WO 2004/032369 A2 | 4/2004 |

OTHER PUBLICATIONS

Cesari, Richard, Estimate Dynamic Range for 3G A/D Converters, Oct. 1, 2002, CommsDesign, p. 2.*
European Search Report for Application No. EP 05 25 5908 mailed Jun. 2, 2006.
"Upper bounds to error probabilities of coded systems beyond the cutoff rate," p. 288, by Dariush Divsalar and Ezio Biglieri; ISIT 2000, Sorrento, Italy, Jun. 25-30, 2000.
3rd Generation Partnership Project 2 "3GPP2" C.S0002-D, Version 0.016 dated Oct. 16, 2003 entitled "Physical Layer Standard for cdma2000 Spread Spectrum Systems," Release D.

* cited by examiner

*Primary Examiner*—Lester Kincaid
*Assistant Examiner*—Steven Lim
(74) *Attorney, Agent, or Firm*—Carlson, Gaskey & Olds, P.C.

(57) ABSTRACT

Data communication includes an estimate of packet error rate that is useful, for example, when there is insufficient data transmission to provide a direct measurement of packet error rate. At least one pilot channel output provides a basis to determine an estimated packet error rate. One example includes using a pilot channel ratio of an energy-per-chip to a noise spectrum density. Another example includes using a pilot symbol error rate from the pilot channel as the basis for determining the traffic channel packet error rate.

17 Claims, 3 Drawing Sheets

PACKET ERROR RATE ESTIMATION IN A COMMUNICATION SYSTEM

FIELD OF THE INVENTION

This invention generally relates to telecommunications.

DESCRIPTION OF THE RELATED ART

Communication systems may be based upon hardwired connections, wireless signal transmissions or a combination of the two. Some systems are capable of handling voice communications. Some are capable of handling data communications. Some are capable of handling more than one type of communication (i.e., voice and data).

In data communication systems, information bits are typically grouped into a frame or packet format and transmitted to a receiver. The received packets may be lost or include errors because of a noisy channel for transmitting the data, for example. The packet error rate (PER) is the percentage of received packets that include an error.

Known systems determine a PER directly by counting the number of lost or erroneous packets during a time interval. In many situations, however, it is not possible to adequately determine the PER using direct counting techniques. In many data transmission arrangements, the transmission is not continuous over the channel. Data transmissions tend to be bursty, for example. During silent periods where there are no received data packets, there is nothing to be counted and no basis for determining the PER.

Another situation where directly counting to determine the PER does not necessarily provide reliable results is when the actual PER is very small. For example, the PER may be on the order of $10^{-4}$ or $10^{-5}$. Within a limited time interval, the number of received packets is not large enough to provide sufficient information for accurately determining the PER.

The PER is an important metric indicating the channel quality and system performance. PER can be controlled by adjusting a signal-to-noise ratio (SIR), introducing redundancy or both to reduce the occurrence of packet errors. Known systems are designed to attempt to maintain PER below a selected target. There is a trade-off between service quality and signal transmit power that typically affects the selection of the PER target.

Forward error correction (FEC) and automatic repeat request (ARQ) are traditional error protection schemes in communication systems. At a transmitter, an encoder adds redundancy to protect the information bit in the form of parity bits. At the receiver, a decoder explores the redundancy so that a certain number of errors can be corrected. A coded system can tolerate more channel errors per interface and, therefore, can afford to operate at a lower transmit power and transmit at a higher data rate. For ARQ, the transmitter sends a packet to the receiver. The receiver performs error detection upon receipt of the packet to determine whether the packet has errors. The receiver sends an acknowledgement back to the transmitter indicating whether the packet was successfully received. If the packet is not received correctly, the transmitter retransmits the same packet. Otherwise, the transmitter removes the packet from its buffer and processes the next packet.

There is also a combination of the FEC and ARQ techniques, which is known as the hybrid ARQ (HARQ) scheme. Two specific techniques are known within HARQ: Chase combining and incremental redundancy. An original data packet is coded with a low rate FEC code. The coded packet is then divided into multiple sub-packets. Each sub-packet is used as the unit for transmission. In Chase combining, each sub-packet is the same as the original coded packet. If the sub-packet is decoded with errors, the next sub-packet is transmitted. At the receiver, multiple received sub-packets are optimally combined and decoded. With incremental redundancy, each sub-packet is different and has redundancy information of the original packet. If the first sub-packet is decoded incorrectly, the next sub-packet is transmitted. At the receiver, multiple received sub-packets are concatenated together and form a coded word for decoding. Using more sub-packets in a transmission results in a longer coded word at the receiver with more redundancy information. Accordingly, each transmission in an incremental redundancy technique provides additional redundancy information for higher error correction capability.

In wireless communication systems, convolutional codes and turbo codes are typically used as the FEC codes.

PER in a coded system depends on the ratio of the bit energy to noise spectrum density (Eb/No), the FEC code rate, ARQ scheme and the packet size. A decoding error probability for convolutional codes and turbo codes is difficult to compute analytically. Instead of obtaining the precise error probability, a bound typically is derived to reflect a reasonable level of decoding performance. For purposes of discussion, the data transmission on the traffic channel occurs in one example using wireless communication. One example system that has this capability is the 1xEV-DV system, which is the third generation CDMA2000 standards defined by 3GPP2.

There are multiple channels configured on a reverse link in the 1xEV-DV system. The high speed data channel for transmitting user traffic is the reverse link packet data channel (R-PDCH). The transmission time unit on this channel is typically referred to as a slot and often has a 10 millisecond duration. An encoder packet coded with a FEC code is divided into sub-packets. Each sub-packet is scheduled and transmitted within a time slot. There are various different encoder packet sizes. Turbo code is known to be used as the FEC code for PDCH. Convolutional code is known to be used for legacy 3G1x traffic channels, such as the fundamental channel (FCH) and supplemental channel (SCH). The transmission rate on R-PDCH typically varies from 6.4 KBPS up to 1.8 MBPS and is dynamically set according to the channel condition and the available data at the mobile station. The different transmission rate on the R-PDCH is the result of different encoder sizes and the modulation scheme.

In one example, hybrid ARQ is used on the R-PDCH to explore time diversity and error performance improvement.

The reserve link pilot channel (R-PICH) is used to continuously send the pilot sequence. The pilot sequence is a sequence of unmodulated, known signals such as a plurality of binary digits. In a CDMA spread spectrum system, the pilot signal is used to determine multi-path component characteristics and help coherent demodulation of the received signals. The transmit power on the pilot channel is used as a reference point for other channels, for example. The R-PDCH, for example, has a fixed offset over the transmit power of the pilot channel that is typically called T2P (traffic to pilot) ratio.

In a CDMA system, for example, it is desirable to keep the PER of the traffic channel below a certain target. In one example, 1% PER maintains a reasonable quality of user data service. Adjusting a traffic SIR maintains control of the PER. When the PER is too high, for example, the target SIR will be increased. When the PER is too low, for example, the target SIR will be decreased to reduce the interference generated by a particular mobile station. Adjusting the target SIR to maintain the PER below a target threshold is sometimes referred to as outer loop power control. Inner loop power control adjusts the transmit power according to the target SIR. The inner loop and outer loop power control are operated concurrently to achieve a good system performance. The power control portion 22 of a base station is responsible for the outer loop power control.

The PER value is used for outer loop power control, for example. Under some circumstances it is possible to achieve a direct measurement of the PER on the PDCH (i.e., the traffic channel). There are times, however, where no packets are available and the power control portion 22 of a base station is not able to directly measure PER. Under such circumstances, the outer loop power control may be compromised.

An additional consideration is that the R-PDCH in 1xEV-DV has four different modes designed for different applications. For example, the boost mode is designed for delay-sensitive applications. In the boost mode, the packet is sent at a higher power than the power setting for the regular mode. This increases the success probability of a first transmission and reduces retransmission delay. As a result, the PER after HRAQ combining is usually very small in the boost mode. It can be less than 0.1%, for example. Under such circumstances it is difficult to directly calculate a PER even when there are received packets available.

This invention addresses the need for determining a PER even when there is insufficient received data such that a direct determination of PER is not possible or reliable. Several techniques for estimating PER are disclosed.

SUMMARY OF THE INVENTION

An example method of communicating includes determining the packet error rate for a traffic channel using at least one selected output of an associated pilot channel.

In one example, the selected output comprises a pilot channel ratio of an energy-per-chip to a noise spectrum density. Translating the pilot channel chip energy to noise ratio to a corresponding traffic channel bit energy to noise ratio and then using a vector expression of the corresponding traffic channel bit energy to noise ratio provides an equivalent traffic channel bit energy to noise ratio that is then used for estimating a packet error rate on the traffic channel.

In another example, the selected output comprises a pilot symbol error rate from the pilot channel. Translating the pilot symbol error rate to a corresponding traffic channel bit error rate and then determining a vector expression of the corresponding rate allows for determining an equivalent channel bit error rate. The traffic channel packet error rate can then be determined based upon the equivalent traffic channel bit error rate.

One example includes predetermining a fitting function that accounts for any discrepancies between an estimated packet error rate based upon the selected output of the associated pilot channel and an actual packet error rate for a given time interval. The fitting function can be used to make any necessary adjustments to a subsequently determined packet error rate based upon the pilot channel output.

The various features and advantages of this invention will become apparent to those skilled in the art from the following detailed description. The drawings that accompany the detailed description can be briefly described as follows.

DETAILED DESCRIPTION

Figure 1:
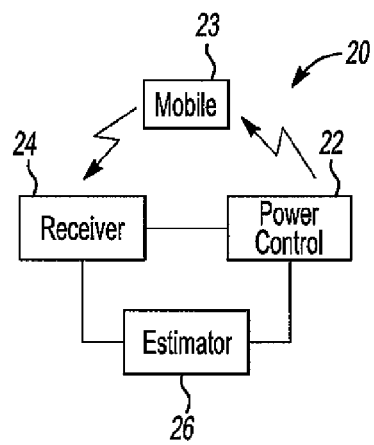
FIG. 1 schematically illustrates selected portions of an example communication system.

FIG. 1 schematically shows selected portions of a communication system 20. In this example, a power control portion of a base station used for wireless data communications sets a threshold power level to achieve a target packet error rate (PER). In one example, the threshold is a signal to noise ratio (SIR). A mobile station 23 uses the threshold to control its transmitting power in a known manner.

A receiver portion 24 receives data packets from the mobile station 23 on a traffic channel in a known manner. The receiver portion 24 also receives a reverse link pilot signal on a pilot channel in a known manner.

An estimator portion 26 provides an estimated PER to the power control portion 22. In one example, the estimated PER is based upon at least one selected output of the pilot channel. In one example, the selected output is a ratio of an energy-per-chip to a noise spectrum density of the pilot channel. In another example, the selected output is a pilot symbol error rate from the pilot channel. Using the pilot channel output to estimate the PER of a traffic channel used for data transmission enables the power control portion 22 to set an appropriate threshold even under circumstances when there is insufficient data transmission on the traffic channel to enable direct measurement of the PER.

Before considering some example methods of estimating the traffic channel PER based upon the pilot channel output, it is useful to consider some features of an example technique for determining a decoding error probability.

The decoding error probability of a convolutional code or Turbo code is a function of the specific code rate, coded word length and the channel bit error rate (Pb). The channel bit error rate is a function of the ratio of the bit energy to noise spectrum density (Eb/No) and the modulation scheme. For a specific code of interest and modulation scheme, the decoding error probability Pe can be expressed as a function of the Eb/No $$P_e = f_1(E_b/N_0) \quad (1)$$

for convolutional code, or $$P_e = f_1'(E_b/N_0) \quad (2)$$

for Turbo code.

Or Pe can be expressed as a function of Pb $$P_e = f_2(P_b) \quad (3)$$

for convolutional code, or $$P_e = f_2'(P_b) \quad (4)$$

for Turbo code.

It is practically difficult to analyze and obtain the close form solution of the decoding error probability. Instead, an upper bound typically is used to represent the performance of convolutional codes or Turbo codes. The upper bounds on Pe in AWGN channels have been studied. The description relies upon the well-known upper bounds for AWGN channels and uses extensions to include other time-varying channels and the effect of HARQ.

Wireless fading channel is time varying. Power control intends to track the channel variation and fluctuates the received signal strength around the target SIR. In addition, because of HARQ, the received packet consists of sub-packets that are transmitted at different times. All these factors cause the Eb/No or bit error probability (Pb) of the received packet to vary. The well-known analytical bounds for Pe for AWGN channels are no longer applicable anymore in this scenario.

Therefore, extensions to the analysis including deriving bounds while considering the varying Eb/No or Pb situations is useful. An equivalent Eb/No in AWGN channels is used in one example. Assume that for a specific code word and modulation scheme, Pe is a function of the varying Eb/No or Pb, which is represented by a L-dimension vector, $$P_e = g_1(\overline{(E_b/N_0)}) \quad (5)$$

or $$P_e = g_2(\overline{P_b}) \quad (6)$$

For AWGN channels, Pe is represented by equation (1) or (2). The equivalent Eb/No or Pb is defined as $$P_e = f_1((E_b/N_0)_{equ}) = g_1(\overline{(E_b/N_0)})$$

$$(E_b/N_0)_{equ} @ f_1^{-1}(g_1(\overline{(E_b/N_0)})) \quad (7)$$

$$P_e = f_2((P_b)_{equ}) = g_2(\overline{P_b})$$

or $$(P_b)_{equ} @ f_2^{-1}(g_2(\overline{P_b})) \quad (8)$$

In other words, the equivalent Eb/No (or Pb) is an equivalent constant value in AWGN channels that generates the same Pe as the one with the varying Eb/No (or Pb) values. This transforms the analysis of Pe for varying Eb/No (or Pb) to the task of finding the equivalent Eb/No or Pb.

Since the analysis for convolutional codes and Turbo codes are different, it is useful to separately consider the functions for calculating the Pe for the two types of codes accordingly.

For convolutional codes, the functions for calculating the equivalent Pb or Eb/No are noted as:

$$(E_b/N_0)_{equ\_cov} = h_1(\overline{E_b/N_0}) \quad (9)$$

or $$(P_b)_{equ\_cov} = h_2(\overline{P_b}) \quad (10)$$

For Turbo codes, the functions for calculating the equivalent Eb/No or Pb are noted as:

$$(E_b/N_0)_{equ\_turbo} = h_1'(\overline{E_b/N_0}) \quad (11)$$

or $$(P_b)_{equ\_turbo} = h_2'(\overline{P_b}) \quad (12)$$

Figure 2:
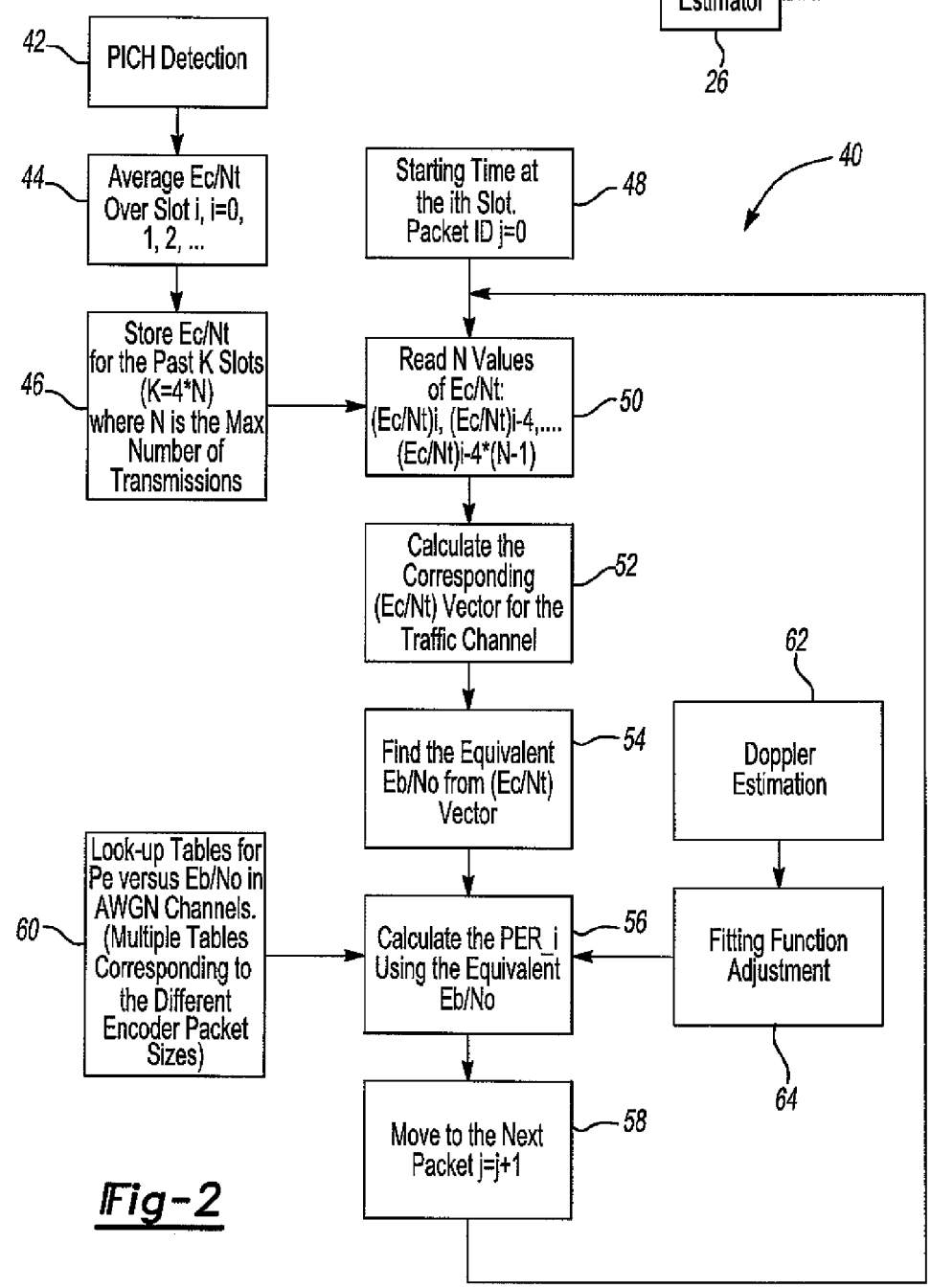
FIG. 2 is a flowchart diagram summarizing one example method of estimating a packet error rate.

In one example, a relationship between the received pilot symbols and the PER of the traffic channel is determined based upon a pilot channel ratio of an energy-per-chip to a noise spectrum density. Referring to FIG. 2, a flow chart 40 summarizes this example approach. The pilot channel sequence is detected at 42. An average energy-per-chip to noise spectrum density ratio (Ec/Nt) over a slot duration can be discerned from the pilot channel using known techniques. In this example, the average Ec/Nt is the selected pilot channel output that provides the basis for an estimate of the traffic channel PER.

The average Ec/Nt over a slot index i is determined at 44. At 46, the average Ec/Nt for K slots is stored, where K=4*N and N is the maximum number of transmissions allowed for a packet. In one example, the N transmissions corresponds to the number of retransmissions of a packet using HARQ. Therefore, it is possible to form a vector having a dimension N by using each of the transmissions of a packet.

Estimating the traffic channel PER begins at an ith slot at 48 where a packet ID j=0, where j represents the received sequence number of the packets. In an example having retransmission, the inter-arrival time of each packet is not a constant. At 50, the estimator portion 26 reads N values of Ec/Nt. At 52, the N values of Ec/Nt are translated to a corresponding Ec/Nt on the traffic channel. In one example, the ratio of the Walsh code spreading factor for the pilot channel (PICH) and the Walsh code spreading factor for the reverse link of the traffic or packet data channel (R-PDCH) is W. The translation at 52 in FIG. 2 can be accomplished using the following equation:

$$(E_c/N_t)_n^{PDCH} = W(E_c/N_t)^{PICH} \quad (13)$$

In one example there are a maximum number N transmissions per encoder packet. An encoder packet will be declared in error after the maximum number of transmissions is reached. A coded packet in one example consists of N sub-packets. The step 52 in FIG. 2 in this example includes forming a vector expression of Ec/Nt with a dimension N, where each element (Ec/Nt)n represents the Ec/Nt of the $n^{th}$ sub-packet. Assuming that at the ith slot, the maximum number of transmissions of a particular packet would have been reached the N values of the vector Ec/Nt of the packet can be expressed as:

$$(E_c/N_t)_n^{PDCH} = W(E_c/N_t)_{i-(N-n-1)*4}^{PICH}, n=0, K, N-1 \quad (14)$$

The term (N−n−1) is multiplied by four in this example because the retransmission of a sub-packet is four slots later from the most recent sub-packet transmission Next, at 54, an equivalent Eb/No on the traffic channel is determined from the Ec/Nt vector. In an example where convolutional code is used, Equation (9) provides the equivalent Eb/No. In an example where turbo code is used, Equation (11) provides the equivalent Eb/No.

The equivalent Eb/No then is used as an input parameter to Equation (1) in examples using convolutional codes. For examples including turbo codes, the equivalent Eb/No is the input parameter to Equation (2) above. In either case, the result is calculating the Pe for the $j^{th}$ packet on the traffic channel. This occurs at 56 in FIG. 2. The estimated PER of the traffic channel then results from completing the calculations described above.

In the example of FIG. 2, the next step at 58 is to increment the value of j and to again repeat the process.

Also in the example of FIG. 2, the calculations at 56 includes using a look up table 60 that provides relationships between Pe and Eb/No in AWGN channels for the different encoder packet sizes. The calculation at 56 also includes using a known Doppler estimation technique at 62. That estimation in this example is used to determine an appropriate fitting function adjustment for the estimated PER at 64.

In one example, the fitting function is determined from an empirical analysis comparing a directly measured PER over a given time period with an estimated PER using the just-described algorithm over the same time period. The fitting function is then useful for subsequent adjustments, if any are necessary, to have the estimated PER correspond as closely as desired to the directly measured PER. In one example, the fitting function is denoted as F(·), which is different based on the code type. In such an example the Pe can be expressed as:

$$P_e = F(f(E_b/N_0), c) \quad (15)$$

where c is a constant and can be tunable for different scenarios. The c can be adjusted based on the channel state information such as the Doppler frequency, path diversity, etc. Given this description, those skilled in the art will be able to select an appropriate fitting function to meet the needs of their particular situation.

Figure 3:
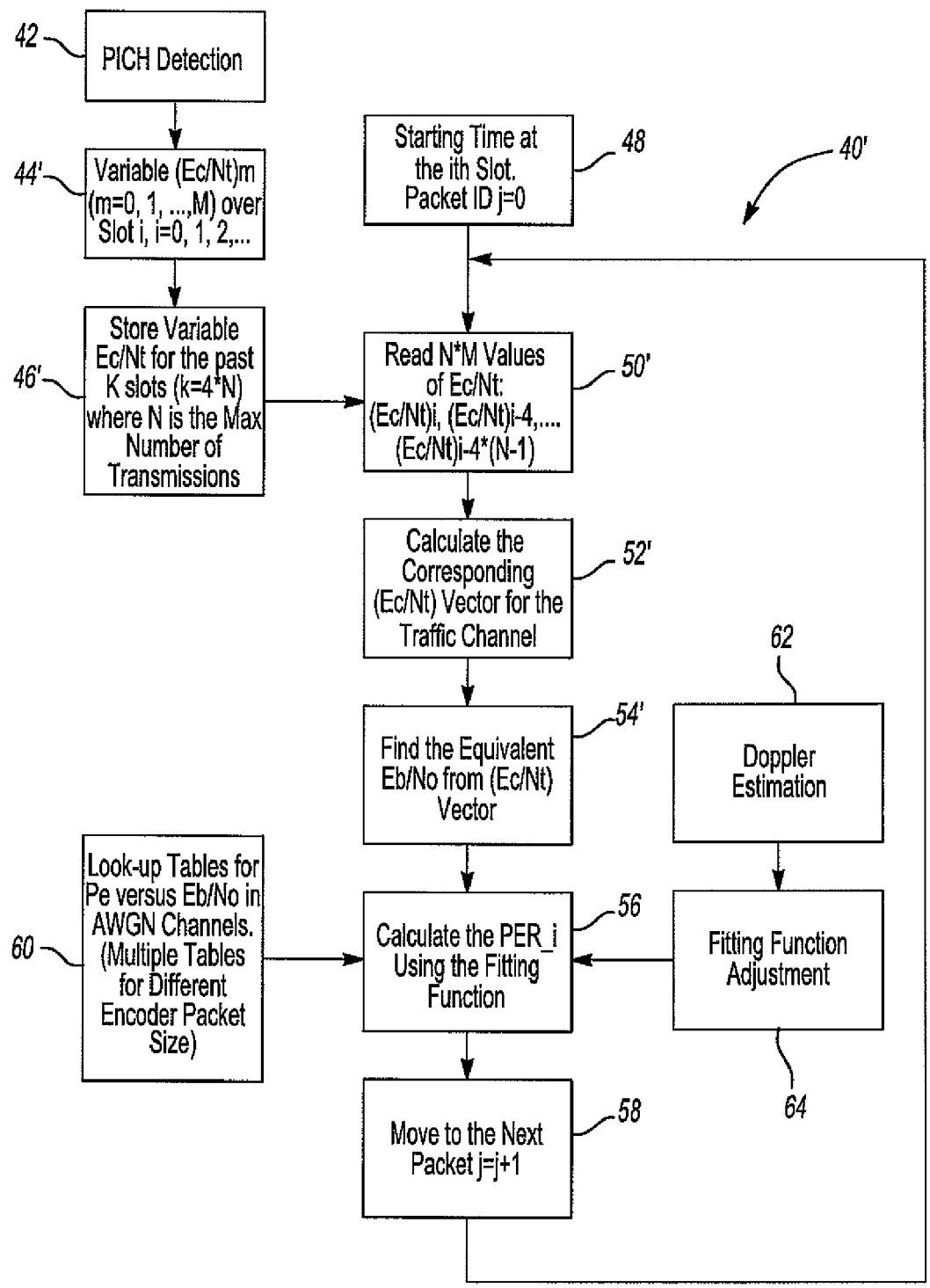
FIG. 3 is a flowchart diagram showing an alternative method of estimating packet error rate.

Another example approach for estimating the PER of the traffic channel based upon a selected output of the associated pilot channel is summarized in the flow chart of FIG. 3. In this example, a flow chart 40' includes much of the technique used in the example summarized in FIG. 2. Accordingly, similar numbering is found in FIGS. 2 and 3. The difference between the example of FIG. 2 and the example of FIG. 3 is that while an average Ec/Nt per slot was used in FIG. 2, the Ec/Nt used in the example of FIG. 3 varies and has different values per slot. In one example, the pilot channel provides Ec/Nt for every power control group interval. In one example, each time slot occupies 10 milliseconds and each power control group interval occupies 1.25 milliseconds. In this example, there are eight values of Ec/Nt from the pilot channel for each time slot. Each of these Ec/Nt values are gathered at 44' and stored at 46'. In this example, the eight values of Ec/Nt per slot are used to form the vector expression. Even in a situation where a packet is successfully received on a first transmission, the multiple pilot channel Ec/Nt values per slot serve as a basis for forming the vector.

The estimator portion 26 utilizes the individual values of Ec/Nt at 50' instead of using average values as occurred in the previously described example. For purposes of discussion, M denotes the number of Ec/Nt values in each slot. In this example, the estimator portion 26 calculates M Ec/Nt values for the traffic channel corresponding to the Ec/Nt values from the pilot channel. Equation (13) is used in one example. In an example including HARQ where the maximum N sub-packets are combined, there are M*N values of Ec/Nt for the coded packet.

At 52' the corresponding Ec/Nt vector for the traffic channel is determined. At 54' the equivalent Eb/No for the traffic channel is determined. It should be noted that in this example, there is more intensive computation as more Ec/Nt values are used. The trade off between additional computation and additional accuracy will dictate a preference between the example summarized in FIG. 2 and this example summarized in FIG. 3. Given this description, those skilled in the art will be able to select a technique that best meets the needs of their particular situation.

Figure 4:
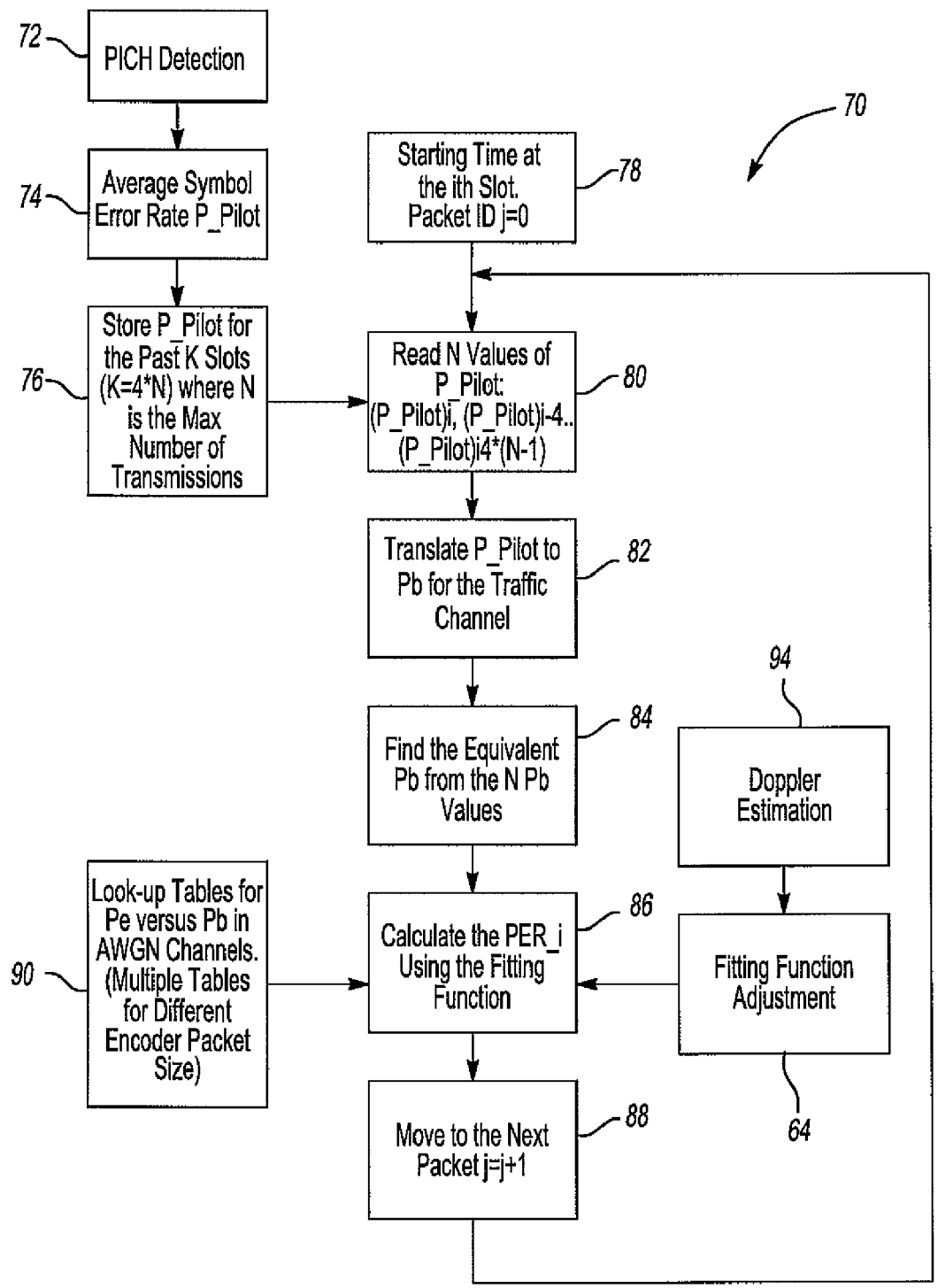
FIG. 4 is a flowchart diagram summarizing another example method of estimating packet error rate.

Another example is summarized in FIG. 4. In this example, a flow chart 70 includes detecting the selected output of the pilot channel at 72. In this example, the selected output is a symbol error rate of the pilot channel. At 74, an average symbol error rate is determined. At 76, the average symbol error rate for K slots is stored.

The estimator portion 26 selects a starting time at the ith slot for a packet ID of j=0 at 78. At 80, the estimator portion 26 reads N values of the pilot channel symbol error rate.

At 82, the estimator portion 36 translates the pilot symbol error rate to a corresponding bit error rate Pb for the traffic channel. Such translation is used because traffic channels have different modulation schemes and coding compared to the pilot channel. In one example, known techniques and known relationships based on the modulations and codings are used to perform the translation.

In an example including HARQ operation, each sub-packet has a different Pb if the reporting interval of the pilot symbol error rate is smaller than the total packet transmission time. In one example, a vector of Pb has a dimension N if the reported pilot symbol error rate is 1 per slot and there are a total of N slots used for transmissions.

At 84, the equivalent Pb for the traffic channel is determined from the N corresponding Pb values using Equations (10) or (12) above, for example.

The equivalent Pb value is then used at 86 to determine the estimated PER using Equations (3) or (4) above, for example. The process continues at 88 for the next packet.

In the example of FIG. 4, a look up table 90 that includes information regarding Pe relative to Pb for different encoder packet sizes is used for determining the estimating PER at 86. A fitting function 92 based upon a Doppler estimation 94 adjusts, as may be necessary, the estimated PER as mentioned above.

Any one of the examples disclosed above provides the ability to estimate a traffic channel PER based upon at least one selected output of the corresponding pilot channel. More than one of the disclosed techniques could be used simultaneously or a combination of them may be possible. Those skilled in the art who have the benefit of this description will realize which technique would best meet the needs of their particular situation. Similarly, one skilled in the art who has the benefit of this description will be able to configure an estimator portion 26 using hardware, software, firmware or a combination of these to provide an estimated PER to meet the needs of their particular situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising:
    determining, by a processor, a traffic channel packet error rate using at least one selected output of an associated pilot channel, the selected output comprising a pilot channel chip energy to noise ratio;
    determining M*N values of the selected pilot channel output, where M is an integer corresponding to a number of values of an energy-per-chip to noise ratio and N is a maximum number of transmissions per encoder packet; and
    translating the determined values of the selected pilot channel output to N values of a corresponding traffic channel output.

2. The method of claim 1, comprising translating the pilot channel chip energy to noise ratio to a corresponding traffic channel bit energy to noise ratio.

3. The method of claim 2, comprising using an average of the pilot channel chip energy to noise ratio per time slot when translating to the corresponding traffic channel bit energy to noise ratio per time slot.

4. The method of claim 2, wherein there are a plurality of values of the pilot channel chip energy to noise ratio per time slot and comprising using each of the plurality of values per time slot when translating to the corresponding traffic channel bit energy to noise ratio per time slot.

5. The method of claim 2, comprising determining a vector expression of the corresponding traffic channel chip energy to noise ratio having a dimension N, where N is the maximum number of transmissions per encoder packet and a coded packet has N sub-packets.

6. The method of claim 5, comprising determining an equivalent traffic channel bit energy to noise ratio from the vector expression.

7. The method of claim 6, comprising determining the traffic channel packet error rate from the equivalent traffic channel bit energy to noise ratio.

8. The method of claim 7, comprising using a predetermined fitting function to adjust the determined traffic channel packet error rate.

9. The method of claim 2, comprising determining an equivalent traffic channel bit energy to noise ratio from the corresponding traffic channel bit energy to noise ratio.

10. The method of claim 9, comprising determining the traffic channel packet error rate from the equivalent traffic channel bit energy to noise ratio.

11. The method of claim 1, wherein the selected output comprises a pilot symbol error rate from the pilot channel.

12. The method of claim 11, comprising translating the pilot symbol error rate to a corresponding traffic channel bit error rate.

13. The method of claim 12, comprising
determining a vector expression of the corresponding traffic channel bit error rate; and
determining an equivalent traffic channel bit error rate from the vector expression.

14. The method of claim 13, comprising determining the traffic channel packet error rate from the equivalent traffic channel bit error rate.

15. The method of claim 14, comprising using a predetermined fitting function to adjust the determined traffic channel packet error rate.

16. The method of claim 12, comprising determining an equivalent traffic channel bit error rate from the corresponding traffic channel bit error rate.

17. The method of claim 16, comprising determining the traffic channel packet error rate from the equivalent traffic channel bit error rate.

* * * * *